Jan. 12, 1960  W. HAHN ET AL  2,920,546
PHOTOGRAPHIC SHUTTER FOR MONOCULAR MIRROR REFLEX CAMERAS
Filed Dec. 2, 1955
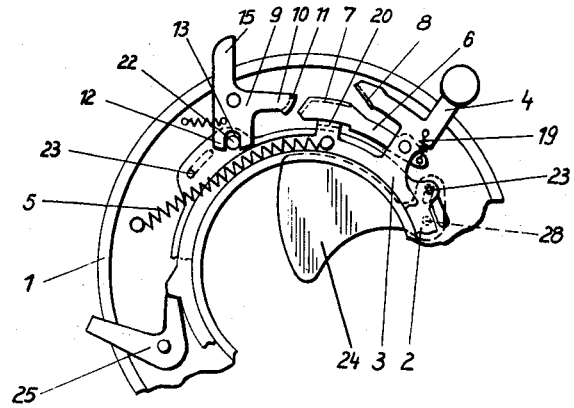
INVENTORS
WERNER HAHN
OSKAR FISCHER
BY
Irwin S. Thompson
ATTY.

United States Patent Office 2,920,546
Patented Jan. 12, 1960

2,920,546

PHOTOGRAPHIC SHUTTER FOR MONOCULAR MIRROR REFLEX CAMERAS

Werner Hahn and Oskar Fischer, Dresden, Germany, assignors to VEB Zeiss Ikon Dresden, Dresden, Germany Application December 2, 1955, Serial No. 550,725

2 Claims. (Cl. 95—63)

The present invention relates to a photographic shutter for monocular reflex cameras comprising an arrangement permitting additional opening of the shutter for the purpose of vision through the view-finder.

It is the purpose of the invention to provide a simple shutter opening arrangement and by means of such an arrangement it is intended to achieve the object of being able to convert an ordinary objective shutter into a special shutter suitable for monocular reflex cameras without great expenditure.

The forms of embodiment of additional opening arrangements for the purpose of vision through a viewfinder as have become known hitherto are made such that they cannot be installed in an ordinary objective shutter without major structural changes. This fact applies especially to those arrangements where great value is attached to effecting the interruption of the flash lamp current circuit, in order to prevent contact-making during the observation in the ground glass plate, necessarily in the shutter housing. The arrangement of additional members which extend out of the shutter housing and cooperate in the interior thereof with members of the drive mechanism requires greater expenditure, since for these members special mounting positions in the form of journals, guides, etc., must be provided.

These disadvantages are removed in accordance with the invention due to the fact that a member of the blade driving mechanism has an arm projecting out of the shutter housing and thus becomes the actuating member of the opening arrangement.

As is known in principle, the blade driving mechanism constitutes a kinematic chain. This consists of a driving element provided with a force-storing means, some transmission members—also including blade driving rings—and driver members present in the form of blades. In accordance with the invention, only one of the transmission members need be exchanged for a corresponding one, the new transmission member having an arm extending out of the shutter housing after installation therein.

In order that even an objective shutter with flash lamp contact arrangement may be converted into such a special shutter—in accordance with a further feature of the invention—a second contact arrangement (as disclosed by Steiner in U.S. patent specification No. 2,304,035) was preferably provided within the camera housing. This contact arrangement, which is expediently controlled by an element actuated in synchronism with the shutter mechanism, interrupts the flash lamp current circuit during the observation in the ground glass plate, in dependence upon the opening function.

An example of embodiment of the invention is illustrated in the accompanying drawing which shows the partial representation of an objective shutter with additional opening arrangement in its position of rest with the shutter closed.

In the shutter housing 1 there are rotatably mounted the blade driving ring 2 and the cocking and control ring 3 which will be designated briefly hereafter as cocking ring. The cocking lever 4 serves for the cocking of the cocking ring 3, acting as drive element, against the action of its force-storing means 5. A release lever 25 is provided on the housing for holding the cocking ring in its cocked position and also for releasing the cocking for an exposure to be made. The cocking ring 3 carries a rotatably mounted striker lever 6 having a striker cam 7. A spring 19 presses the striker lever 6, when in its rest position, against the stop 20. Furthermore, the cocking ring 3 has a closing cam 8. The transmission lever 9 has an arm 10 with a bent-over lug 11 and an arm 12 with a slot 13. The transmission lever 9 is engaged with a pin 22 secured on the blade driving ring 2 through the slot 13. The blade driving ring 2 is connected by pins 23 with the blades 24 pivoted at 28. A further arm 15 of the transmission lever 9 extends out of the shutter housing and serves for the additional opening of the shutter for the purpose of vision through the viewfinder.

After cocking the shutter the release lever 25 is moved so that the cocking ring 3 runs off out of the cocked position. The striker cam 7 strikes upon the lug 11 on the transmission lever 9 and pivots the latter in the counterclockwise direction. The lug 11 then slides upon the striker cam 7 until it leaves the latter and is moved in the clockwise direction by the closing cam 8 for the acceleration of the closing movement of the blades.

On actuation of the transmission lever 9 in the counterclockwise direction by means of the arm 15 the blade driving ring 2 is driven by way of the pin 22 by the slot 13 (Figure 2). The blades 24 thereby move into their open position.

We claim:

1. A photographic shutter of the between-the-lens type for monocular mirror reflex cameras, comprising in combination a casing, a plurality of shutter blades pivotally mounted on the casing and within the casing, a blade driving ring also within the casing mounted in the casing for rotation about its axis and operatively connected with said blades for moving the shutter blades into open and closed positions, a shutter cocking ring mounted in the casing and rotatable about the axis of the cocking ring, a shutter cocking lever carried by the cocking ring extending to a position outside the casing, a release element also mounted on the casing for releasably holding said cocking ring in its cocked position, a resilient means operatively connected with said cocking ring so as to continuously urge said cocking ring towards its position of rest, a transmission member pivotally mounted on the casing and operatively connected to said blade driving ring for transmitting the driving force of the cocking ring to the blade driving ring, means mounted on said cocking ring to provide a driving connection between the cocking ring and the transmission member, and an arm provided on said transmission member extending out of the casing whereby the operator can move said transmission member for supplementary opening of the shutter for the purposes of viewing and focusing the object to be photographed.

2. A photographic shutter of the between-the-lens type for monocular mirror reflex cameras according to claim 1 wherein the means mounted on the cocking ring comprises a first striker member pivotally mounted on said cocking lever and is positioned to engage and drive the transmission member in one direction of the latter on the running down of the cocking ring after release thereof in order to open the shutter and a second striker member mounted on the cocking lever and positioned to engage and rotate the transmission member in the opposite direction thereof on the continued running down of the cocking ring in order to close the shutter.

References Cited in the file of this patent

UNITED STATES PATENTS

| | | |
|---|---|---|
| 2,290,362 | Springer | July 21, 1942 |
| 2,304,035 | Steiner | Dec. 1, 1942 |
| 2,326,077 | Steiner | Aug. 3, 1943 |
| 2,331,569 | Pirwitz | Oct. 12, 1943 |
| 2,333,820 | Riddell | Nov. 9, 1943 |
| 2,365,847 | Steiner | Dec. 26, 1944 |
| 2,404,526 | Pirwitz | July 23, 1946 |
| 2,524,786 | Fuerst | Oct. 10, 1950 |
| 2,527,781 | Willcox | Oct. 31, 1950 |
| 2,552,273 | Fuerst | May 8, 1951 |
| 2,625,088 | Fuerst | Jan. 13, 1953 |

FOREIGN PATENTS

| | | |
|---|---|---|
| 720,848 | Great Britain | Dec. 29, 1954 |